United States Patent [19]

Fuller

[11] Patent Number: 4,994,211
[45] Date of Patent: Feb. 19, 1991

[54] WATER DISTRIBUTION APPARATUS FOR EVAPORATIVE COOLING SYSTEM

[76] Inventor: Joe W. Fuller, 6921 W. Fullam, Peoria, Ariz. 85345

[21] Appl. No.: 402,474

[22] Filed: Sep. 5, 1989

[51] Int. Cl.$^5$ .............................................. B01F 3/04
[52] U.S. Cl. .............................. 261/97; 261/DIG. 74; 137/412
[58] Field of Search ................ 261/97, DIG. 74; 137/412

[56]  References Cited

U.S. PATENT DOCUMENTS

| | | | |
|---|---|---|---|
| 1,346,898 | 7/1920 | Kingsbury | 137/412 |
| 1,778,198 | 10/1930 | Metcalfe | 137/412 |
| 2,413,138 | 12/1946 | Feinberg | 137/412 |
| 2,549,204 | 4/1951 | Kaddatz | 137/412 |
| 2,631,829 | 3/1953 | Carraway | 261/412 |
| 2,634,112 | 4/1953 | Snow | 261/97 |
| 2,708,849 | 5/1955 | Steenbergh | 137/412 |
| 2,856,166 | 10/1958 | Goeth | 261/97 |
| 3,157,716 | 11/1964 | Morris | 261/97 |
| 3,171,401 | 3/1965 | McDuffee | 261/97 |
| 3,446,489 | 6/1969 | Leva | 261/97 |
| 4,132,238 | 1/1979 | Clark | 137/192 |
| 4,193,417 | 3/1980 | Bowman et al. | 137/192 |

Primary Examiner—Tim Miles
Attorney, Agent, or Firm—H. Gordon Shields

[57] ABSTRACT

Water control apparatus for evaporative cooling system includes a medium which is saturated with water from a water supply and water draining from the medium is directed to a pan or trough in which there is a float system and which includes orifices through which water flowing into the pan flows out of the pan. The float system includes a microswitch which controls a solenoid connected to the water supply system either directly or indirectly through a time delay relay. The relay may be variable so that the delay time may be adjusted in accordance with appropriate parameters.

18 Claims, 3 Drawing Sheets

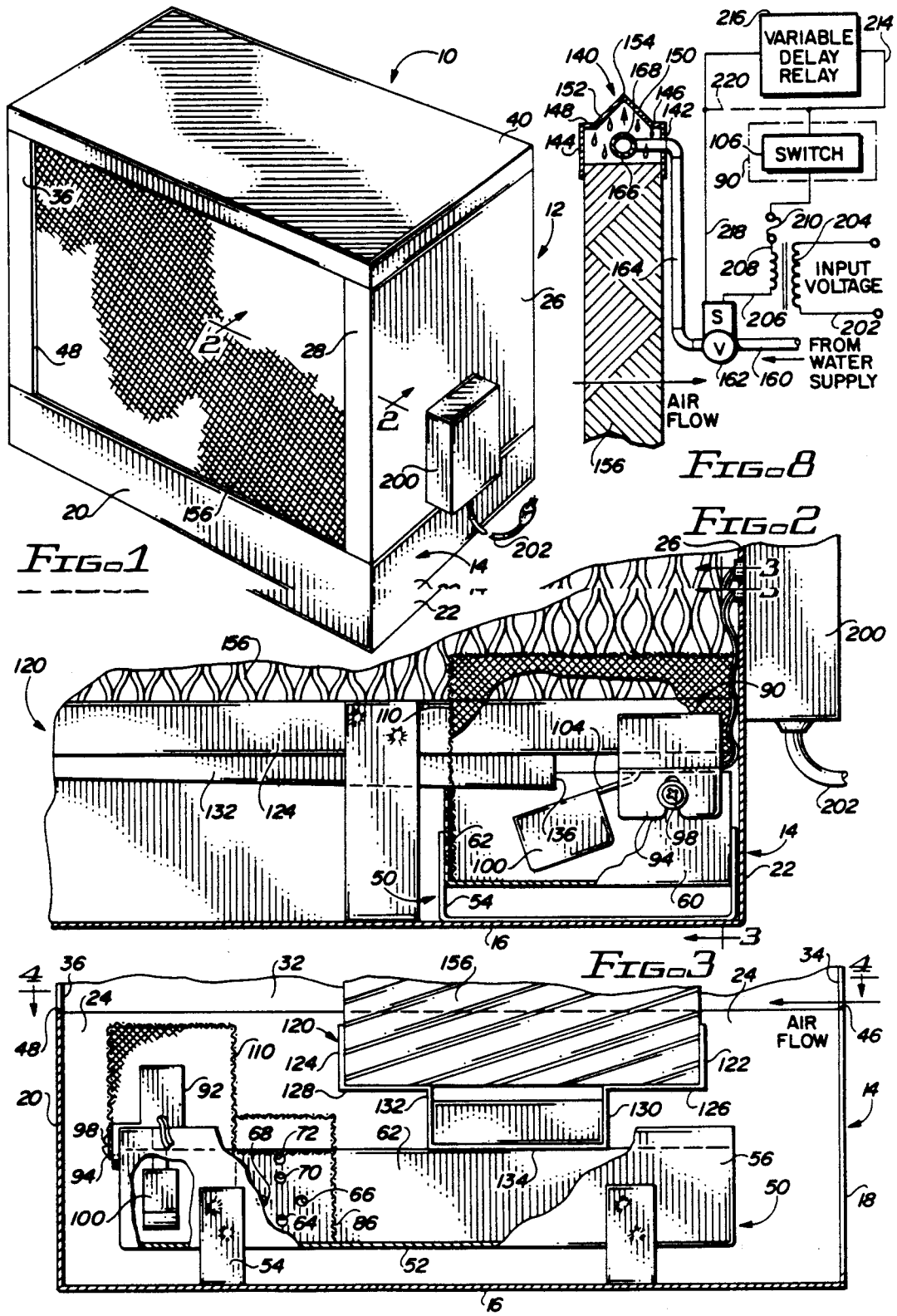

WATER DISTRIBUTION APPARATUS FOR EVAPORATIVE COOLING SYSTEM

BACKGROUND OF THE INVENTION

1. Field of the Invention:

This invention relates to evaporative cooling systems and, more particularly, to water distribution apparatus for an evaporative cooling system.

2. Description of the Prior Art:

In relatively hot, relatively dry areas, evaporative cooling systems are popular for their relatively low cost of acquisition and operation. Basically, evaporative cooling systems include a medium which is saturated with water and through which hot air is drawn by a blower. The air passing through the water saturated cooling medium gives up heat of evaporization in evaporating the water from the medium. The air thus cooled is then distributed for cooling purposes.

Early evaporative cooling systems, and typical contemporary evaporative cooling systems, utilize a small pump to circulate water over the cooling medium. The pump is operational during the times that the blower is also operational. Water is thus constantly recirculated. A float controlled valve system connected to a water source replenishes water lost by evaporation.

In efforts to save water, or to conserve water, systems have been suggested for limiting the amount of water flowing over the medium. By doing this, the requirement of the recirculating pump may be eliminated. Moreover, water is saved since only an amount of water sufficient to keep the medium relatively well saturated is required.

In addition, by eliminating the recirculation of the water, there is minimum salt (mineral) accumulation on the medium. The salt accumulation on the medium decreases the efficiency of the medium as time progresses. Even with the bleeder circuits of the past several years, there is still a substantial amount of highly mineralized recirculated water which deposits excess salts on the medium.

Prior art attempts for optimizing the use of the water with respect to the cooling medium by providing only the amount of water to keep the medium saturated or wetted has been directed toward non-recirculating systems controlled by straight timer circuits. That is, a timer circuit will turn on a water supply system for a specific amount of time, and then the circuit turns off, stopping the water flow. The timer has both predetermined "on" times and predetermined "off" times. For example, a typical timer situation may be to turn on to provide water for one minute and then to go off for one minute.

Obviously, such predetermined, fixed time systems cannot take into consideration the actual evaporation of the water from the medium, and thus may either allow the cooling medium to dry out or may supply excess water to the medium. The timer system cannot be affected by changes in the evaporation rate due to air volume, air velocity, or the condition of the evaporative medium.

Moreover, the timer system is not able to take into consideration fluctuations in water pressure. If the water pressure is high, an excess amount of water may be provided. If water pressure is low, then the medium may only become marginally wetted.

The apparatus of the present invention overcomes the problems of the prior art by utilizing a float activated switch system combined with calibrated orifices in a catch pan to allow water to drain at a predetermined rate from the pan. The amount of water in the pan, and flowing out of the pan through calibrated orifices, determines the on time and off time of the water supply system.

SUMMARY OF THE INVENTION

The apparatus of the present invention includes a pad support channel designed to catch and route water that flows through the evaporative or cooling medium (pad) to a "catch" pan. A float actuated switch mechanism is located in the catch pan. When a predetermined amount of water builds up in this pan, the float rises and causes the switch to open which, in turn, deactivates a solenoid which shuts off the water supply to the medium.

The water in the catch pan drains out through orifices causing a gradual lowering of the float. At a predetermined low level, the float closes the switch and activates the solenoid which starts the water flow to the medium.

The control system may include a delay timer mechanism to further delay the "on" time of the solenoid thereby increasing the period of operation without water (dry operation).

Among the objects of the present invention are the following:

To provide new and useful water control apparatus for an evaporative cooling system;

To provide new and useful water control system for controlling the flow of water to an evaporative cooling medium;

To provide new and useful system for controlling the flow of water;

To provide a new and useful water control system utilizing a float actuated switch system connected to a solenoid;

To provide new and useful water control system utilizing a delay relay in series with a float actuated switch system; and To provide new and useful apparatus for controlling the flow of water in response to a flow of water through an orifice.

BRIEF DESCRIPTION OF THE DRAWING

FIG. 1 is a perspective view of the apparatus of the present invention.

FIG. 2 is a view in partial section taken generally along line 2—2 of FIG. 1.

FIG. 3 is a view in partial section taken generally along line 3—3 of FIG. 2.

FIG. 4 is a view in partial section taken generally along line 4—4 of FIG. 3.

FIG. 5 is a fragmentary view of a portion of the apparatus of the present invention taken generally along line 5—5 of FIG. 4.

FIG. 6 is a front view of an alternate embodiment of the apparatus of FIG. 5.

FIG. 7 is an exploded perspective view of a portion of the apparatus of the present invention.

FIG. 8 is a schematic representation of the electrical system and the water supply system of the apparatus of the present invention.

FIG. 9 is an exploded perspective view of an alternate embodiment of the apparatus of the present invention.

FIG. 10 is an elevational view of the apparatus of FIG. 9 illustrating its operation.

FIG. 11 is a view in partial section taken generally along line 11—11 of FIG. 10.

DESCRIPTION OF THE PREFERRED EMBODIMENT

FIG. 1 is a perspective view of an evaporative cooler 10 which includes the apparatus of the present invention. FIG. 2 is a view in partial section through the evaporative cooler 10 taken generally along line 2—2 of FIG. 1, illustrating elements of the apparatus of the present invention, including a catch pan 50, a float switch 90, and a bottom frame 120 for an evaporative cooling medium 156 that receives excess water from the medium and channels the water to the catch pan. FIG. 3 is a view in partial section of evaporative cooler 10 taken generally along line 3—3 of FIG. 2.

FIG. 4 is a view in partial section of evaporative cooler 10 taken generally along line 4—4 of FIG. 3. FIG. 5 is a fragmentary view of a portion of the apparatus of the present invention, taken generally along line 5—5 of FIG. 4. FIG. 6 is a front view of an alternate embodiment of the elements illustrated in FIG. 5. FIG. 7 is an exploded perspective view of the apparatus of the present invention. FIG. 8 is a schematic illustration, with elements shown in partial section, of the water supply system and electrical system of the apparatus of the present invention. For the following discussion, reference will be made to all of the FIGS. 1–8. Specific reference will be made to particular figures for purposes of clarity, as required.

Evaporative cooler apparatus 10 includes a housing 12 in which is disposed the catch pan or trough 50 and the bottom frame 120 which supports the evaporative cooling medium 156. The housing 12 includes a base or bottom pan 14, a top or cap 40, and a pair of end walls 26 and 32 extending from the base or bottom pan to the top or cap 40.

The base pan 14 includes a bottom 16, with four upwardly extending and relatively short walls. The walls include a front wall 18, a rear wall 20, and a pair of side walls 22 and 24. Extending upwardly from the pan 14 is the end wall 26. Extending outwardly or forwardly from the side wall 26 is a pair of flanges, including a front flange 28 and a rear flange 30. The end wall 32 likewise includes a pair of flanges extending outwardly from it, including a front flange 34 and a rear flange 36. The top or cap 40 extends downwardly over the end walls 26 and 32 and their respective flanges.

As best shown in FIGS. 1 and 4, there are two openings in the housing 12. There is a front opening 46 and a rear opening 48. The evaporative medium 156 is disposed adjacent to the front opening 46. Thus, air flow through the cooler apparatus 10, powered by a fan or blower, not shown, extends inwardly through the opening 46, through the evaporative cooling medium 156, and outwardly from the apparatus 10 through the rear opening 48.

The catch pan or trough 50 is disposed adjacent to the end wall 22 and the front wall 18 of the base pan 14. The trough 50 includes a bottom 52 which is supported a relatively short distance above the bottom 16 of the pan 14 by a pair of support feet 54. The trough 50 also includes four upwardly extending walls, a rear wall 56, an end wall 58, an end wall 60, and a front wall 62. The rear wall 56 and the end walls 58 and 60 are of the same height. The front wall 62 is slightly lower than the rear wall 56 and the side walls 58 and 60.

A pair of frames support the evaporative cooling medium 156. The frames include the bottom frame 120 and a top frame 140. The frames 120 and 140 are individual elements, not connected together except by the medium 156. The frame 140 comprises a top frame which fits over the medium, and the frame 120 is a bottom frame which receives the medium and which receives and channels excess water to the trough 50.

The bottom frame 120 includes a pair of sides 122 and 124 which are spaced apart from each other a distance which is substantially the same as the width or thickness of the medium 156. The sides 122 and 124 extend upwardly from a pair of bottom flanges 126 and 128, respectively. The flanges 126 and 128 are generally aligned on the same plane, as best shown in FIG. 3. The flanges 126 and 128 are spaced apart from each other. Extending downwardly from the flange 126 is a drip flange 130. Extending downwardly from the flange 128 is a drip flange 132. The flanges 130 and 132 are spaced apart from each other and are generally perpendicular to the bottom flanges 126 and 128, respectively. The height of the flanges 130 and 132 varies generally over the length of the frame 120, as can best be understood from FIG. 2.

The bottom frame 120 includes a drip bottom 134 which extends between the flanges 130 and 132 at their bottom or lower edge. The bottom 134 connects together the flanges 130 and 132. The drip bottom 134 is slanted downwardly so that water draining into the drip portion of the bottom frame 120 will drain into the trough 150. The flanges 126 and 128 extend generally horizontally (or level) so that the medium 156 is disposed generally square with the housing 12 and its various walls, etc.

Essentially, the sides 122, 124, and the flanges 126, 128 comprise a pad or evaporative medium support channel. The flanges 130, 132 and the bottom 134 comprise a runoff water or draw or drain water channel.

As shown in FIGS. 2, 3, and 4, the drip flanges 130 and 132 and the bottom 134 terminate in an edge 136 inwardly from the outer edge of the bottom frame 120. The bottom 134 rests on the top of the front wall 62 of the trough 50. With the edge 136 terminating inwardly from the outer end of the frame 120, the water draining from the medium 156 conveniently flows into the trough or catch pan 50. The outer edges of the bottom frame 120 terminate adjacent to the side walls of the housing 12, including the aligned side walls 22, 26 and 24, 32.

The drip flanges 130 and 132 and the bottom 134 comprise a channel or define a channel which receives water draining or dripping from the medium 156 and which deposits the water into the trough 50.

As best shown in FIG. 8, the medium top frame 140 includes a downwardly extending flange 142 and a downwardly extending flange 144. The flanges 142 and 144 extend downwardly on the sides of the medium 156. The sides 142 and 144 are generally aligned with the sides 122 and 124, respectively, of the bottom frame 120.

Extending inwardly from the flanges 142 and 144 is a pair of top flanges 146 and 148. The flanges 146 and 148 are aligned with each other. Extending inwardly and upwardly from the flanges 146 and 148 is a pair of sloping top walls 150 and 152. The sloping top walls 150 and 152 are joined together at a peak 154.

Within the top frame 140, and spaced apart above the top of the medium 156, is a water header 166. The water header 166 extends generally the full length of the medium 156. In the top part of the header 166 is a plurality of spaced apart holes 168. The holes 168 are in the top or upper portion of the header 166. Water flows out of the header 166 through the holes 168. the water pressure is such that the water sprays out of the holes 168 onto the top sloping walls 150 and 152 of the frame 140 and thence flows downwardly onto the top of the medium 156. The water then permeates through and saturates the medium 156. Excess water from the medium 156 flows into the channel defined by the flanges 130 and 132 and the bottom 134 and into the trough 50 past the edge 136.

Secured to the side 60 of the trough 50 is a float switch 90. The float switch 90 includes a main housing 92 in which is disposed a microswitch 106. (See FIG. 8.) Secured to the main housing 92 is a pair of flanges, an outer flange 94 and an inner flange 96. A fastener assembly, such as a screw, nut, and appropriate washers, etc., extends through the flanges 94 and 96 and through an aperture or hole in the wall 60 to secure the float switch 90 to the trough 50.

A float 100 is secured to a pivot arm 104 by means of a keeper 102. The pivot arm 104, remote from the float 100, is appropriately secured to the housing 92. The microswitch 106 is actuated by movement of the pivot arm 104 in response to movement of the float 100. The float 100 in turn moves in response to the flow of water into and out of the trough 50.

Returning again to FIG. 8, the electrical control circuitry for providing water to the header 166, and accordingly to the medium 156 and to the trough 50, is illustrated.

As shown in FIGS. 1 and 2, an electrical control box 200 is secured to the end wall 26 of the housing 12. Within the control box 200 are appropriate electrical elements that cooperate with the float 100 in controlling the flow of water to the header 166. The header 166 is connected to a water supply line 160 through a solenoid controlled valve 162 and an input line 164. The input line 164 extends from the solenoid control valve 162 to the header 166.

A power cord 202 is appropriately connected to an electrical outlet to provide electrical power for the solenoid of the solenoid controlled valve 162. The power cord 202 extends to the primary winding of a transformer 204. The transformer 204 is a stepdown transformer. The secondary winding of the transformer 204 typically has an output voltage of twenty-four volts. The secondary winding includes a conductor 206 which extends to the solenoid of the solenoid controlled valve 162. The secondary winding of the transformer also includes a conductor 208 which extends through a fuse 210 to the microswitch 106 of the float switch 90. From the microswitch 106, a conductor 214 extends to a variable delay relay 216. From the variable delay relay 216, a conductor 218 extends to the solenoid of the solenoid controlled valve 162.

The solenoid of the solenoid controlled valve 162 controls the flow of water from the water supply line 160 to the input conduit 164 and to the header 166. The condition of the float 100, and of the microswitch 106, is one of two inputs to the solenoid controlled valve 162. In addition to the condition of the switch 106, the setting of the variable delay relay 216, which is in series with the switch 106, is the second variable for the actuation of the solenoid controlled valve 162.

After the float switch 106 calls for water in response to the movement of the float 100 and of the pivot arm 104, the timing out of the variable delay relay 216 must also be considered before the solenoid controlled valve 162 will open to allow water to flow from the supply line 60 to the header 166. The variable delay relay 216 may be adjusted to provide a minimum time in which the solenoid control valve 162 may be actuated. That is, regardless of the status of the float 100 and of the switch 106, no water will flow to the header 166, and accordingly to the medium 156 until the variable delay relay 216 has been timed out. Accordingly, only after the variable delay relay 216 has been timed out to close will the switch 106, or the status of the switch 106, be determinative of the status of the solenoid controlled valve 162 to allow the solenoid to open the valve to allow water to flow therethrough.

The float 100 is responsive to the quantity of water in the trough 50. Assuming the timing out of the relay 216, the solenoid controlled valve 162 will open to allow water to flow ultimately to the medium 156 as long as the float 100 is below the cutoff point of the switch 106. This, in return, depends on how fast the water is flowing into the trough 50 and how fast the water is flowing out of the trough 50.

Water flows out of the trough 56 through a plurality of calibrated holes extending through the front wall 62 of the trough 50. The holes are best shown in FIGS. 3 and 5. In FIGS. 3 and 5, a pattern of five holes or apertures is illustrated. The holes or apertures include a bottom aperture 64 and a pair of apertures 66 and 68 disposed above the aperture 64 and spaced apart from each other but aligned on the same level with each other. Aligned with the aperture 64 is an aperture 70, which is above the apertures 66 and 68. A fifth aperture 72 is aligned with the apertures 64 and 70 and is disposed above the aperture 70.

As the water flows into the trough 50, the water first flows out through the aperture 64, and then through the apertures 66 and 68, in addition to the aperture 64, and then as the water rises higher, through the aperture 70, as well as the apertures 64, 66, and 68. Finally, water flows outwardly through the top aperture 72 as well as the apertures 70, 68 and 66, and 64. The diameters of the apertures 64 ... 72 are appropriately calibrated to allow a particular flow rate for the water out of the trough 50. It will be understood that, as the water rises, the flow through the various apertures will increase not only due to the increased area available to the flow of water but also to the increased pressure of the height of the water.

Obviously, as long as the float 100 is down low, to cause the microswitch 106 to remain closed, water will continue to flow through the valve 162 and outwardly from the holes 168 and the header 166 to help saturate the medium 156. However, as the pad saturates, and as the excess water drains from the pad or medium 156, the water flow into the trough 50 increases to the point where the water height gradually fills the trough 50 and causes the float 100 to move upwardly and ultimately or eventually to open the switch 106. At such time as the flow 106 opens, the electrical circuit to the solenoid of the solenoid controlled valve 162 is opened and the valve then closes, stopping the flow of water.

The excess water draining into the trough 50 then continues to flow out through the holes or apertures 64 ... 72 until the water level in the trough 50 causes the float to lower and thus to close the microswitch 106 once again. However, there is a timing out period between the time when the switch 106 closes and when the variable delay relay 216 times out before the circuit to the solenoid of the solenoid control valve 162 is completed to again open the valve to allow the water to run. During this time, the medium 156 will slightly dry out, in accordance with whatever time is selected. The user of the apparatus may, of course, adjust the time that the variable delay relay is opened in accordance with prevailing conditions, such as temperatures, relative humidity, etc.

The relay 216 is a well known and understood electrical element. When the electrical circuit through the switch 106 is completed, the relay 216 is energized or activated to delay the actuation of the solenoid at the valve 162 by the preset amount of time. The preset time may be from a few seconds to a few minutes, depending on operating and ambient conditions.

For relatively thin evaporative medium 156, such as a thickness of about three inches or so, the relay 216 may be eliminated. This is shown in FIG. 8 by a dotted line conductor 220 extending from the conductor 214 to the conductor 218. In other words, a conductor extends directly from the switch 106 to the solenoid at the valve 162.

To prevent debris and the like from clogging or interfering with the flow of water through the apertures 64 . . . 72, a screen housing 86 is appropriately secured to the wall 60 about the apertures 64 . . . 72. Another screen housing 110 is disposed about the float assembly 90 to prevent debris, etc. from interfering with the action of the float 100, its pivot arm 104, and the microswitch 106.

An alternate embodiment of the holes or apertures 64 . . . 72 is shown in FIG. 6. The apertures in FIG. 6 include a bottom aperture 74, an aperture 76, an aperture 78, an aperture 80, and a top aperture 82. The apertures 74 . . . 82 are aligned vertically. The diameter of the apertures 74 . . . 82 increases so that the diameter of the top aperture 82 is greater than that of the bottom aperture 84. Thus, the flow of the water out of the trough 50 increases with an increasing depth of the water in response to an increased diameter of the apertures as well as to the increased water pressure as the height or depth of the water in the trough 50 increases.

FIG. 9 is a perspective view of an alternate embodiment 300 of the apparatus of the present invention. FIG. 10 is a side elevation view of the apparatus 300 of the present invention. FIG. 11 is a view in partial section taken generally along line 11—11 of the apparatus 300 illustrated in FIG. 10. For the following discussion, reference will primarily be made to FIGS. 9, 10, and 11.

The alternate embodiment 300 includes a float housing 310 to which is secured a float switch 380. The float housing 310 includes a bottom 312, an outer side wall 314, and a top wall 316. The top wall 316 includes a cutout portion 318 in which is disposed a housing 382 of the float switch 380.

Generally parallel to the wall 314, and extending upwardly from the floor 312 is a side wall 320. The side wall 320 includes a water intake opening 322. The opening 322 extends upwardly from the floor 312 to let water, draining from an evaporative cooling medium, such as the medium 156 discussed above, into the housing 310.

The housing 310 includes a back or rear wall 324 which closes to the rear end of the housing and which extends outwardly from the housing to become also a back wall of an expandable or extendable support frame for a bottom frame for the evaporative medium, such as the bottom frame 120 discussed above in conjunction with FIGS. 2, 3, and 4.

The floor 312 also extends outwardly from the housing 310 and becomes the floor or bottom portion of the support frame for the evaporative medium bottom frame and which also, with the back wall 324, and a front wall 340, comprises a housing channel or water receiving portion to channel water from the support frame through the opening 322 and into the housing 310.

The housing 310 also includes a front wall 326. Illustrated in the wall 326 are five openings or apertures, each of which may be of a different diameter, including, from the bottom and extending upwardly, an opening 328, an opening 330, an opening 332, an opening 334, and an opening 336. The bottom opening or hole or aperture 328 is of the smallest diameter, and the diameters may increase upwardly so that the hole or aperture 336 has the largest diameter. This is substantially the same as illustrated above in conjunction with FIG. 6. Thus, water flowing into the housing 310 begins to flow out of the housing first through the lowermost, and the smallest diameter, hole 328. As the depth of the water in the housing 310 increases, the water flow from the housing increases through the holes or apertures.

The front wall 340 extends outwardly from the side 322 of the housing 310 and is generally parallel to the rear wall 334. The wall 340 is also secured to the bottom or floor 312. The wall 340 includes a cutout portion 342 which receives the drip flange and drip bottom of the medium bottom frame. The bottom flange is disposed on the top of the wall 34. This may be understood from the phantom lines in FIG. 10.

An extension or expansion box 350 matingly engages the bottom 312, the side 324, and the side 340 to comprise the trough to receive the drip water from the evaporative medium bottom frame. The extension box includes a bottom portion 352, an end wall 354, a rear wall 356, and a front wall 358. The front wall 358 includes a cut down edge or portion 360, which is substantially the same as the cutdown portion 342, except that the cutdown portion 360 is a mirror image of the cutdown portion 342.

The expansion box or extension 350 extends into the interior of the channel defined by the bottom 312 and the sides 324 and 340, as best shown in FIG. 11. The extension 350 is adjusted to accommodate a specific width of bottom frame. Thus, if the apparatus 300 is designed to go into a small evaporative cooler, or a medium sized evaporative cooler, or a large evaporative cooler, each of which demands a different width of evaporative medium, and accordingly a different width of the bottom frame, the expansion box will be appropriately located relative to the bottom 312 and the sides 324 and 340 so as to accommodate any particular evaporative medium bottom frame. The expansion box 350 is then appropriately secured to the housing portion 310, using the simple expediency of a sealant to render the apparatus 300 relatively water tight. In FIG. 10, the apparatus 300 is illustrated, with the extension or expansion box 350 shown in phantom to accommodate different widths of evaporative medium and bottom frames.

As indicated above, when the expansion box 350 is secured to the water receiving portion of the housing 310, the expansion box and the outwardly extending bottom 312, sides 324 and 340, comprise or define a trough for receiving the excess water from the evaporative medium and for channeling the water into the float housing 310.

The float housing 310 is supported upwardly from the bottom of the evaporative cooler pan, as, for example, see FIGS. 2 and 3, by feet 338 and 339. The extension 350 is similarly supported by feet, such as foot 362 shown in FIGS. 9 and 10.

A screen housing 370 is appropriately secured, as also by a sealant material, over the opening 322 in the wall 320 to prevent debris from flowing with the water into the interior of the housing 310 and from interfering with the flow of the water outwardly through the apertures 328 . . . 336.

The float switch 380 is disposed in the housing 310. The float switch 380 includes a switch housing 382, which extends through the opening 318 in the top 316. Secured to the housing 382 is an outer flange 384, which is disposed on the outer side of the wall 320. The housing 382 is secured to the wall 320 by a screw 388 which extends through the flange 384, and through an inner flange, not shown.

A float 390 is secured to an arm 394. The float 390 is secured to the outer end of the arm 394. The inner end of the arm 394 extends into the housing 382 and is pivotally secured therein. Movement of the arm 394, in response to the water level in the housing 310 and responsive to the float 390, actuates a microswitch, such as discussed above, primarily in conjunction with FIG. 8. Essentially, the float switch 380 is substantially the same as the float switch 90.

The primary advantage of the apparatus 300 is that it comprises virtually a universal trough or catch pan which may be used in or with any size evaporative cooler. The size of an evaporative cooler in turn depends on the width or thickness of the evaporative pad or medium used, or vice versa. Simple adjustment of the extension 350 and then the appropriate sealing or caulking material used to secure the extension 350 to the bottom 312 and sides 324 and 340 of the housing 310 to define a unitary trough and float housing device allows a single unit to be used in virtually any sized evaporative cooler.

Specific reference was made to sealing or caulking material for the extension 350 and to the screen housing 370. Appropriate sealing or caulking material should preferably be used also to seal and to secure the screen housings 86 and 110 to the trough 50.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Water distribution apparatus for an evaporative cooling system having an evaporative cooling medium and a water supply system for providing a flow of water to the medium, comprising, in combination:
    frame means for supporting the evaporative cooling medium and for receiving water draining from the medium;
    trough means for receiving water drained from the medium from the frame means; and
    control means responsive to the water in the trough means for controlling the flow of water in the water supply system to the medium, including
        a float responsive to the amount of water in the trough means,
        a solenoid controlled valve for controlling the flow of water,
        a switch responsive to the float for controlling the solenoid controlled valve, and
        a variable delay relay in series with the switch for providing a variable, predetermined time delay after the switch has responded to the float for providing a flow of water to the evaporative cooling medium.

2. The apparatus of claim 1 in which the trough means includes a plurality of holes through which water flows from the trough means.

3. The apparatus of claim 1 in which the trough means includes a trough having a bottom and sides extending upwardly from the bottom, and hole means through which water drains from the trough.

4. The apparatus of claim 3 in which the hole means includes a plurality of holes, including a lower hole and an upper hole through which water flowing into the trough means successively drains from the trough.

5. The apparatus of claim 3 in which the hole means includes holes of different sizes for draining water at different flow rates.

6. The apparatus of claim 1 in which the frame means includes a supporting channel for supporting the medium and a water drain channel for receiving water draining from the medium and for directing the draining water into the trough means.

7. Water distribution apparatus for an evaporative cooling system having an evaporative cooling medium and a water supply system for providing a flow of water to the medium, comprising, in combination:
    frame means for supporting the evaporative cooling medium and for receiving water draining from the medium;
    trough means for receiving water drained from the medium from the frame means, including
        a float housing,
        a water receiving portion including
            a bottom extending outwardly from the float housing,
            a front wall extending upwardly from the bottom and extending outwardly from the float housing, and
            a rear wall extending upwardly from the bottom and outwardly from the float housing, and
        an extension box mating with the water receiving portion and adjustable with respect thereto to accommodate frame means having different widths; and
    control means responsive to the water in the trough means for controlling the flow of water in the water supply system to the medium.

8. The apparatus of claim 7 in which the float housing includes an opening through which water flows into the float housing from the extension box, the bottom, the front wall, and the rear wall.

9. The apparatus of claim 7 in which the water receiving portion and the extension box have complementary cut down edges for receiving the frame means.

10. Evaporative cooling apparatus, comprising in combination:

an evaporative cooling medium;

housing means in which the evaporative cooling medium is disposed;

water supply means for providing water for the evaporative cooling medium;

frame means in the housing means for supporting the evaporative cooling medium and for receiving water draining from the evaporative cooling medium;

trough means in the housing means for receiving the water draining from the evaporative cooling medium from the frame means; and control means responsive to the water in the trough means for controlling the water supply means to provide water to the pad in accordance with predetermined parameters, including a float responsive to the water in the trough means, valve means for controlling the flow of water to the evaporative cooling medium from the water supply means, a switch responsive to the position of the float, and variable delay means connected to the switch and to the valve means for providing a variable, predetermined time delay after the switch response to the float for controlling the valve means.

11. The apparatus of claim 10 in which the control means includes a float responsive to the water in the trough means and a switch responsive to the position of the float.

12. The apparatus of claim 10 in which the valve means includes a solenoid controlled valve responsive to the switch for controlling water to the evaporative cooling medium.

13. The apparatus of claim 10 in which the frame means includes a first channel for supporting the evaporative cooling medium, and a second channel for receiving the draining water and in which the water flows to the trough means.

14. The apparatus of claim 10 in which the trough means includes hole means through which the water drains into the housing means.

15. The apparatus of claim 14 in which the hole means includes a plurality of holes.

16. The apparatus of claim 15 in which the plurality of holes includes holes of different sizes.

17. Evaporative cooling apparatus, comprising, in combination:

an evaporative cooling medium;

housing means in which the evaporative cooling medium is disposed;

water supply means for providing water for the evaporative cooling medium;

frame means in the housing means for supporting the evaporative cooling medium and for receiving water draining from the evaporative cooling medium;

trough means in the housing means for receiving the water draining from the evaporative cooling medium from the frame means, including a water receiving portion and an extension box securable to the water receiving portion and adjustable for receiving frame means having different widths; and control means responsive to the water in the trough means for controlling the water supply means to provide water to the pad in accordance with predetermined parameters.

18. The apparatus of claim 17 in which the trough means further includes a float housing secured to the water receiving portion and the water flows to the float housing from the water receiving portion.

* * * * *